(12) United States Patent
Kringstad et al.

(10) Patent No.: US 9,139,059 B1
(45) Date of Patent: Sep. 22, 2015

(54) TRACTOR HITCH

(71) Applicant: Kringstad Ironworks, Inc., Hoople, ND (US)

(72) Inventors: Jacob L. Kringstad, Hoople, ND (US); Burnell R. Kringstad, Hoople, ND (US)

(73) Assignee: Safe-T-Pull, Inc., Park River, ND (US)

( * ) Notice: Subject to any disclaimer, the term of this patent is extended or adjusted under 35 U.S.C. 154(b) by 0 days.

(21) Appl. No.: 14/271,581

(22) Filed: May 7, 2014

(51) Int. Cl.
*B60D 1/58* (2006.01)
*B60D 1/24* (2006.01)
*B62D 49/08* (2006.01)

(52) U.S. Cl.
CPC .............. *B60D 1/247* (2013.01); *B62D 49/085* (2013.01)

(58) Field of Classification Search
CPC .............. B60R 3/00; B60S 9/00; B60D 1/52; B60D 1/48; B60D 1/247
USPC .................................................. 280/495, 504
See application file for complete search history.

(56) References Cited

U.S. PATENT DOCUMENTS

| | | | | |
|---|---|---|---|---|
| 3,614,135 A | * | 10/1971 | Eid .............................. | 280/491.5 |
| 3,986,503 A | * | 10/1976 | Le Guillon ....................... | 182/89 |
| 4,027,893 A | * | 6/1977 | Drudge ........................... | 280/487 |
| 4,029,340 A | | 6/1977 | Chelin | |
| 4,262,831 A | * | 4/1981 | Buchanan ...................... | 224/565 |
| 4,403,671 A | | 9/1983 | Schmahl | |
| 4,462,486 A | * | 7/1984 | Dignan ............................ | 182/91 |
| 4,607,858 A | * | 8/1986 | Wagner ....................... | 280/491.5 |
| 4,659,102 A | * | 4/1987 | Stuhrmann et al. ............ | 280/481 |
| 5,348,333 A | * | 9/1994 | Gee ............................... | 280/491.5 |
| 5,522,530 A | * | 6/1996 | Boettcher ....................... | 224/488 |
| 5,690,359 A | | 11/1997 | Teich | |
| 5,833,268 A | * | 11/1998 | Aldrovandi .................... | 280/759 |
| 6,227,304 B1 | | 5/2001 | Schlegel | |
| 6,471,002 B1 | * | 10/2002 | Weinerman ....................... | 182/91 |
| 6,896,281 B2 | * | 5/2005 | Lenzen et al. ................. | 280/495 |
| 6,988,560 B2 | | 1/2006 | Bay | |
| 7,152,883 B2 | | 12/2006 | Niemela | |
| 7,354,066 B2 | * | 4/2008 | Yamamoto ..................... | 280/759 |
| 7,396,030 B2 | * | 7/2008 | Badillo ......................... | 280/163 |
| 7,618,062 B2 | | 11/2009 | Hamm | |
| 7,753,394 B2 | * | 7/2010 | Monostori et al. ......... | 280/490.1 |
| 7,766,357 B2 | * | 8/2010 | Arvanites ....................... | 280/166 |
| 7,934,524 B2 | | 5/2011 | Priebe | |
| 8,201,849 B2 | | 6/2012 | Bauer | |
| 8,205,904 B1 | * | 6/2012 | Carter et al. ................... | 280/481 |
| 8,430,427 B1 | * | 4/2013 | Gaeddert et al. .............. | 280/759 |
| 8,540,269 B2 | * | 9/2013 | Hembise et al. .............. | 280/495 |
| 2002/0014506 A1 | * | 2/2002 | Teich ............................ | 224/441 |
| 2012/0138756 A1 | | 6/2012 | Heimbuch | |

* cited by examiner

*Primary Examiner* — Joseph Rocca
*Assistant Examiner* — Michael Stabley
(74) *Attorney, Agent, or Firm* — Neustel Law Offices

(57) ABSTRACT

A hitch is configured to be attached to a towed vehicle. The hitch includes a mounting bracket and a frame connected to the mounting bracket. The frame has arms extending away from the mounting bracket. The arms surround and define an opening. The arms each have a proximal end connected to the mounting bracket and each arm has a distal end connected to a cross-member. A plate is connected to the cross-member. The plate has a cutout. A support member is connected between the bracket and the frame. The mounting bracket is configured to be attached to a front of the towed vehicle. The front of the towed vehicle has attached weights that are used to counter balance a load on the towed vehicle. The weights are surrounded by the frame and extend into the opening.

13 Claims, 11 Drawing Sheets

TRACTOR HITCH

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a hitch that is attached to a towed vehicle and more specifically it relates to a hitch for attachment to the front of a tractor.

2. Description of the Related Art

Any discussion of the related art throughout the specification should in no way be considered as an admission that such related art is widely known or forms part of common general knowledge in the field.

Agricultural tractors are used to perform a wide variety of farm tasks such as plowing, planting, fertilizing and harvesting crops. Construction equipment such as bulldozers, front end loaders and semi-trucks are used in building roads and buildings. Farm land and construction areas are subject to frequent rains that, especially in poorly drained soils, can result in waterlogged fields and mud. Agricultural tractors and construction equipment operating in these conditions can become stuck and not be able to move under their own power. These disabled vehicles require a pull or tow by a towing vehicle in order to move.

One problem with removing the stuck agricultural tractors and construction equipment from their location is that these vehicles are not provided with any equipment that allows attachment to a towing vehicle. Cables and chains can be attached to various parts of the stuck vehicles and connected to a towing vehicle. The use of cables and chains to tow a vehicle creates several problems. First, because the attachment location is not designed for pulling, the force generated by towing can damage parts of the tractor or construction equipment. Second, cables and chains are dangerous for operators to use. The cables and chains can become loose or disconnected or break from the towed vehicle and fly back toward the towing vehicle and the towing vehicle operator.

Because of the inherent problems with the related art, there is a need for a new and improved tractor hitch.

BRIEF SUMMARY OF THE INVENTION

The invention generally relates to a hitch for attachment to a towed vehicle. The hitch includes a mounting bracket and a frame connected to the mounting bracket. The frame has a pair of arms extending away from the mounting bracket. The arms surround and define an opening. The arms each have a proximal end connected to the mounting bracket and each arm has a distal end connected to a cross-member. A plate is connected to the cross-member. The plate has a cutout. A support member is connected between the bracket and the frame. A reinforcing bar is connected to an inner side of each of the arms. The mounting bracket is configured to be attached to a front of the towed vehicle. The front of the towed vehicle has attached weights that are used to counter balance a load on the towed vehicle. The weights are surrounded by the frame and extend into the opening.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
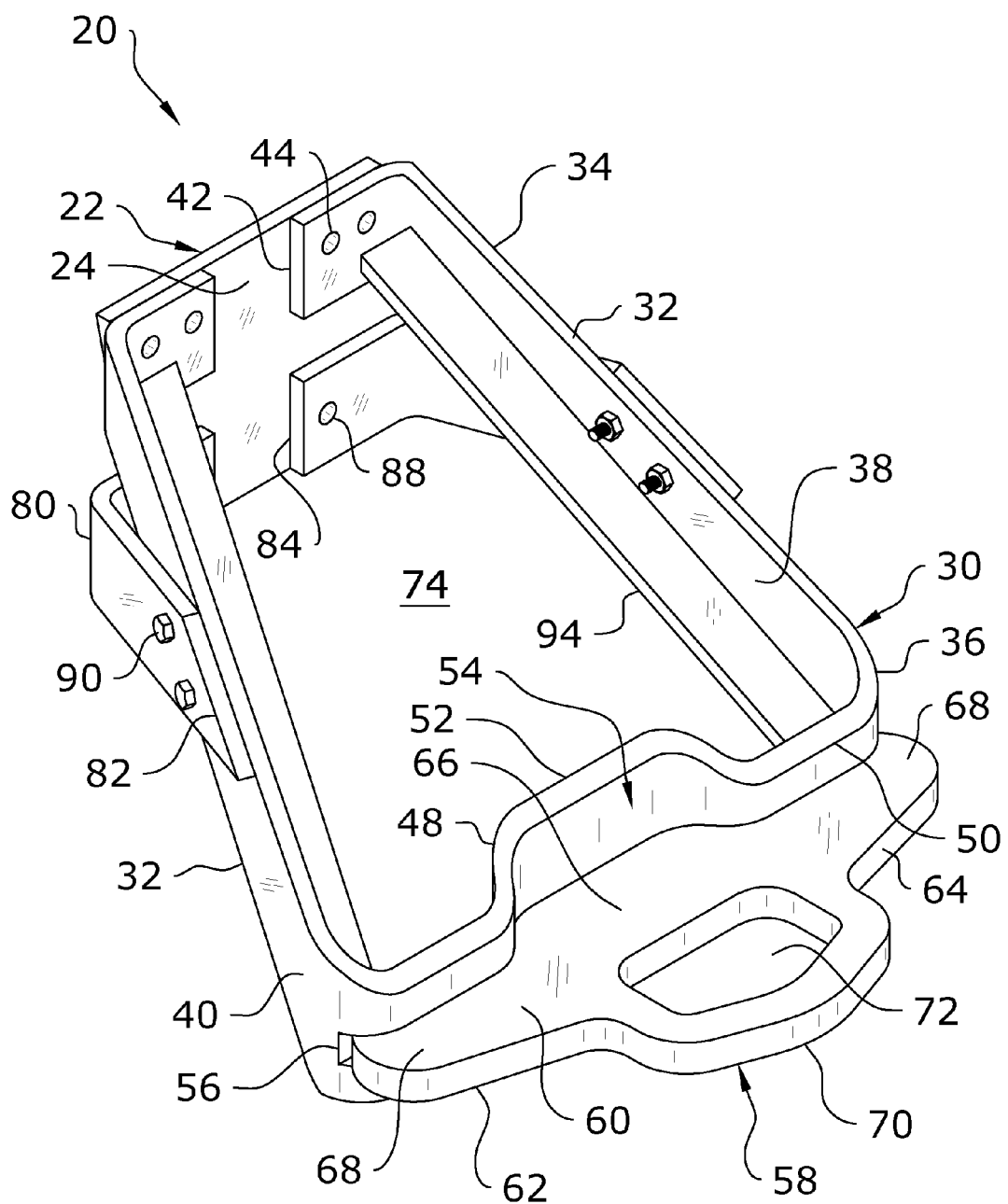
FIG. 1 is an overall upper perspective view of the tractor hitch of the present invention.
Figure 2:
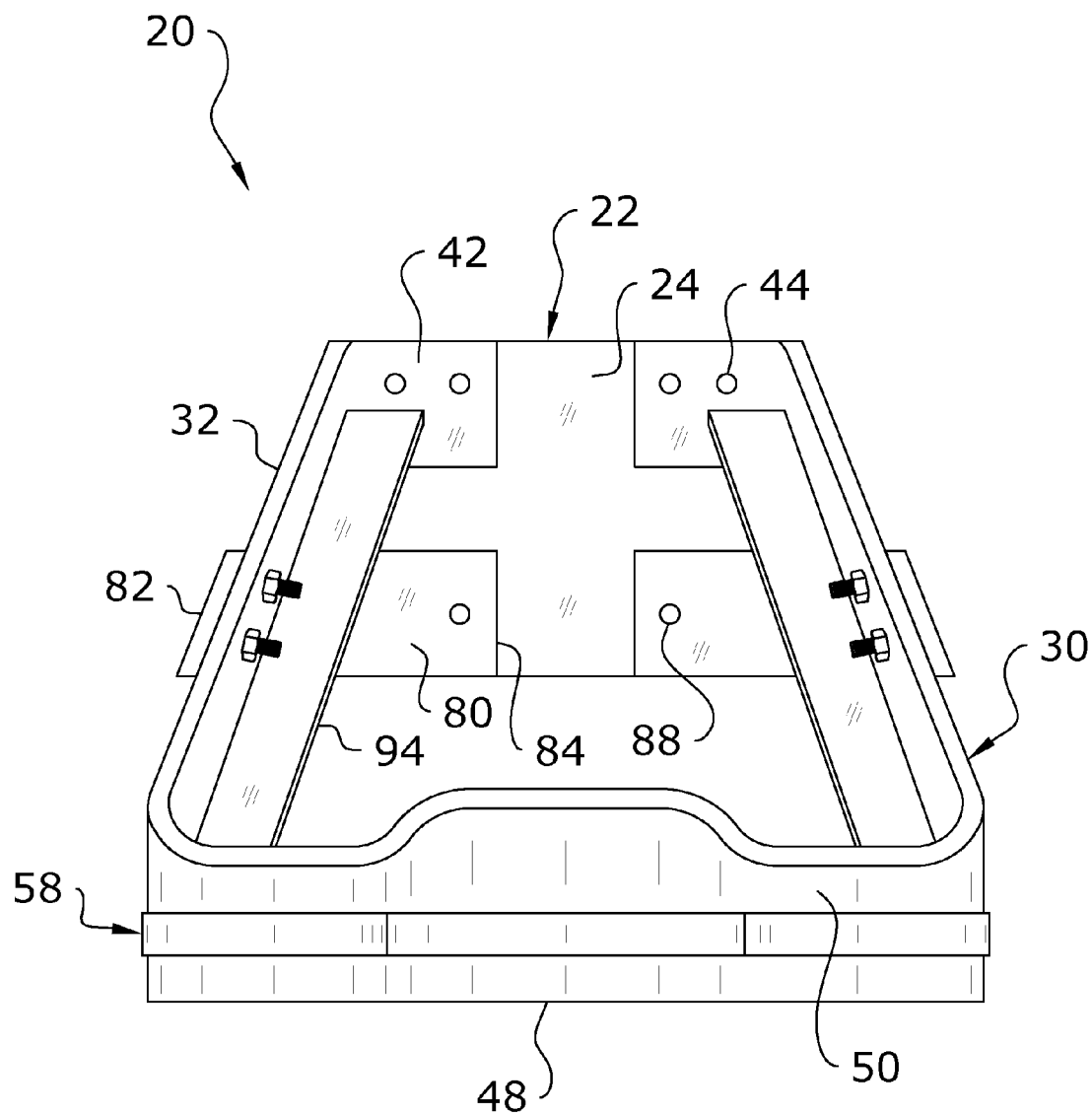
FIG. 2 is a front view of the tractor hitch of the present invention.
Figure 3:
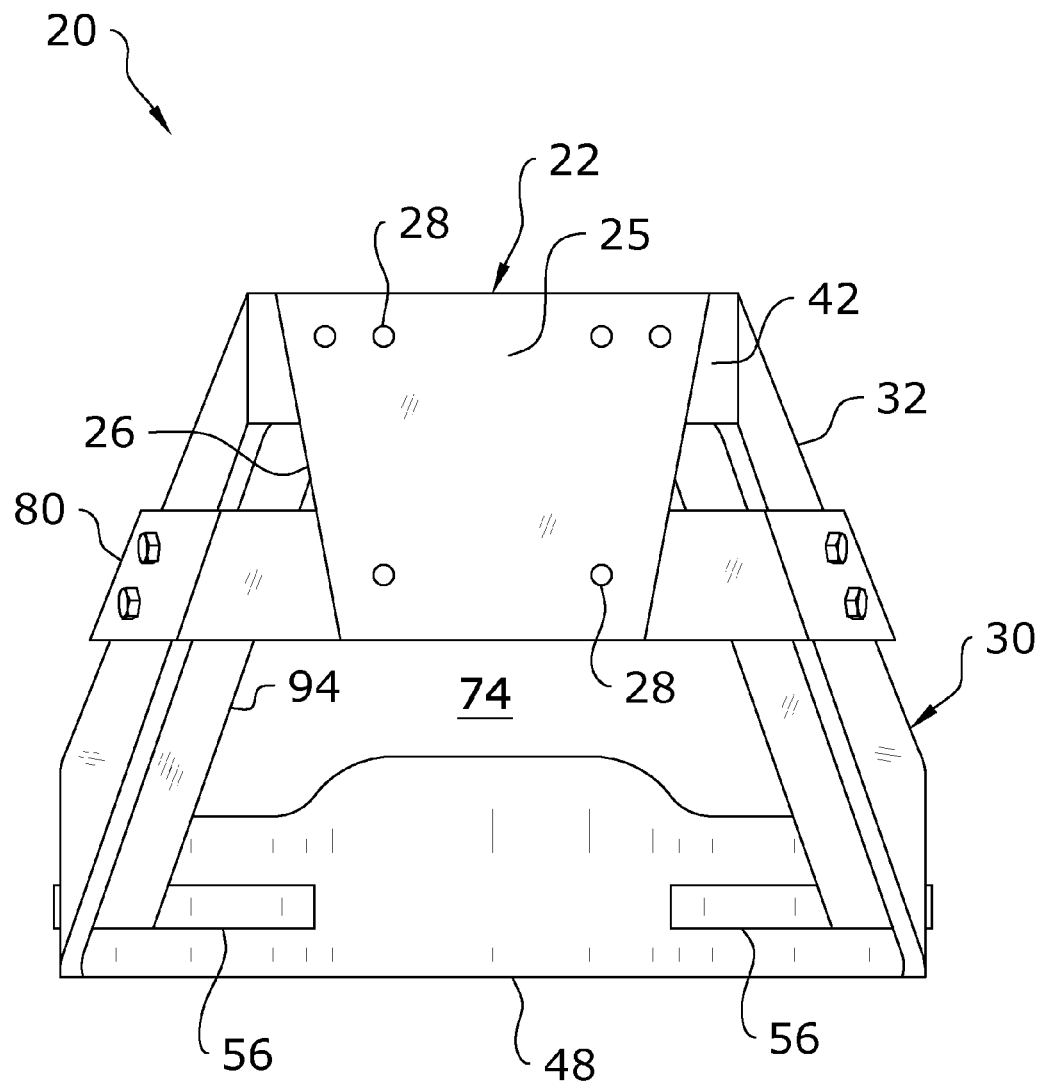
FIG. 3 is a rear view of the tractor hitch of the present invention.
Figure 4:
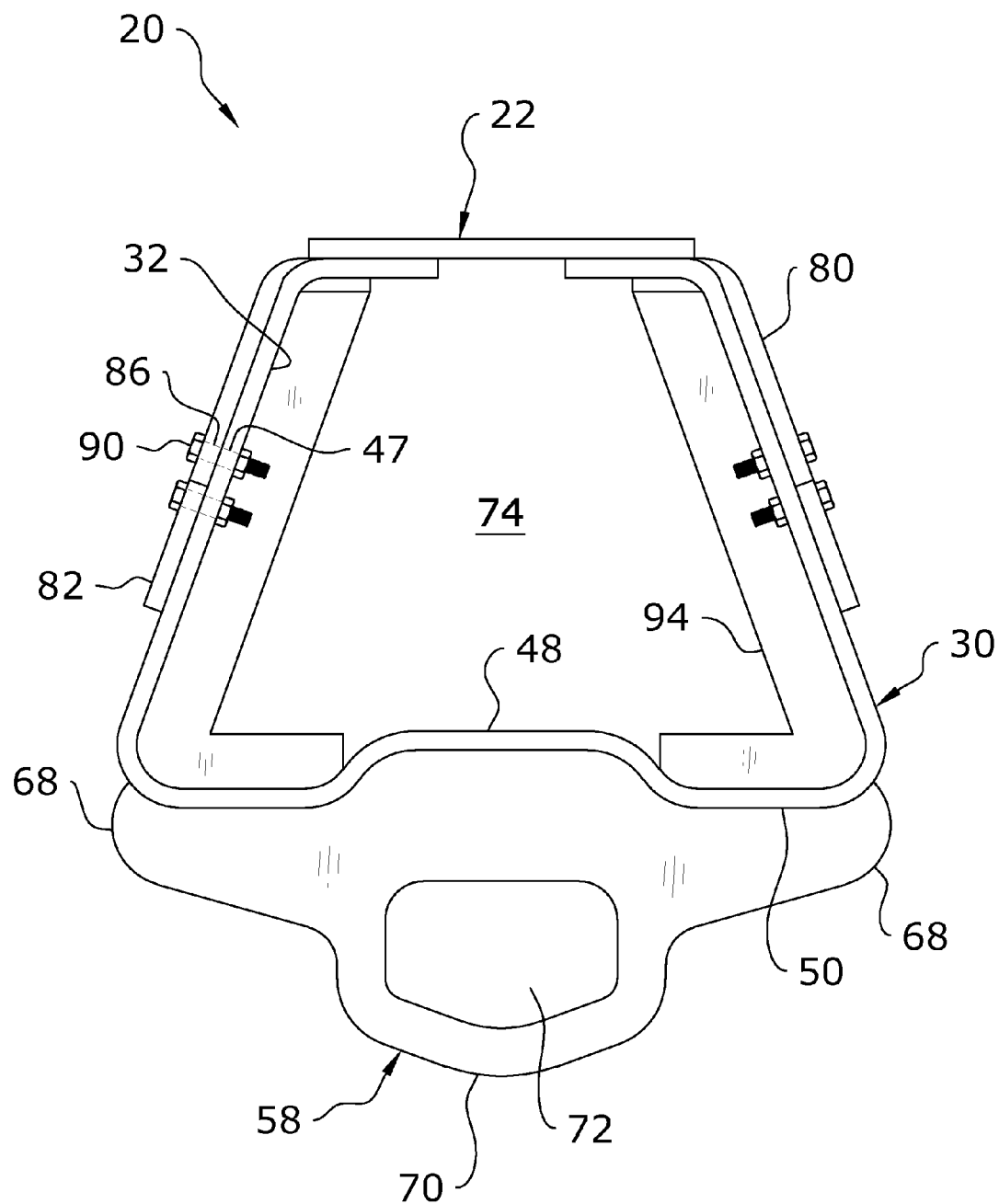
FIG. 4 is a top view of the tractor hitch of the present invention.
Figure 5:
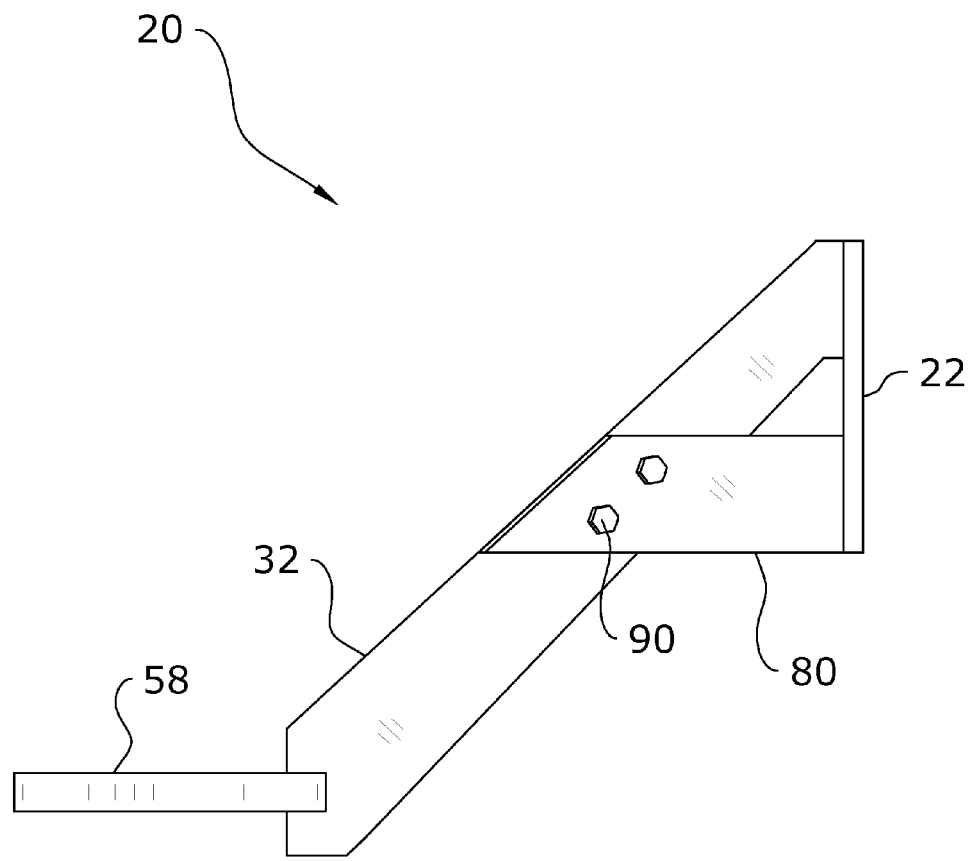
FIG. 5 is a right side view of the tractor hitch of the present invention.
Figure 6:
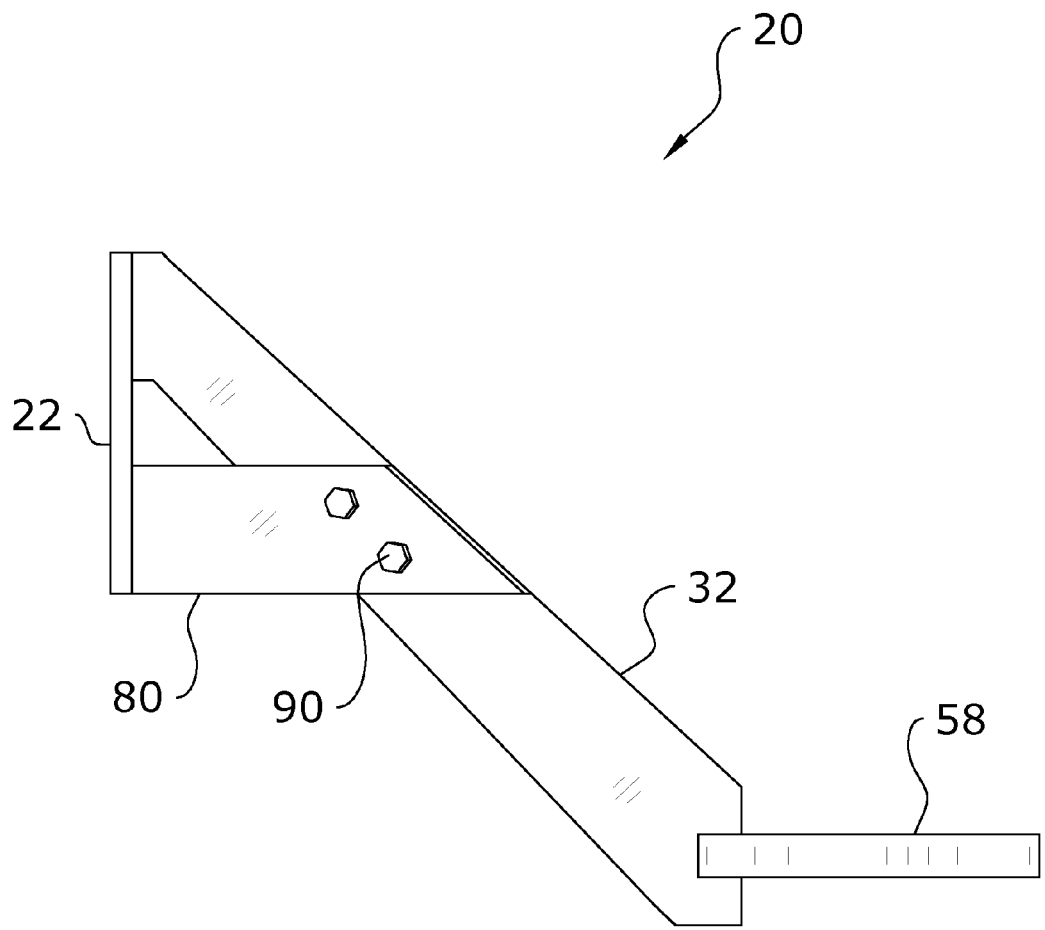
FIG. 6 is a left side view of the tractor hitch of the present invention.

A. Overview.

Turning now descriptively to the drawings, in which similar reference characters denote similar elements throughout the several views, FIGS. 1 through 11 illustrate a hitch or hitch assembly 20 for attachment to a towed vehicle 100. The hitch 20 includes a mounting bracket 22 and a frame 30 connected to the mounting bracket 22. The frame 30 has a pair of arms 32 extending away from the mounting bracket 22. The arms 32 surround and define an opening 74. The arms 32 each have a proximal end 34 connected to the mounting bracket 22 and each arm 32 has a distal end 36 connected to a cross-member 48. A plate 70 is connected to the cross-member 48. The plate 70 has a cutout 72. A support member 80 is connected between the mounting bracket 22 and the frame 30. A reinforcing bar 94 is connected to an inner side 38 of each of the arms 32. The mounting bracket 22 is configured to be attached to a front of the towed vehicle 100. The front of the towed vehicle 100 has attached weights 114 that are used to counter balance a load on the towed vehicle. The weights 114 are surrounded by the frame 32 and extend into the opening 74.

B. Hitch Assembly.

FIGS. 1 through 6 illustrate a hitch or hitch assembly 20 that can be attached to the front of a vehicle such as a tractor that is to be towed. Hitch assembly 20 can be formed from suitable materials such as steel. Hitch 20 comprises a mounting bracket 22, a frame 30 and a plate 70. The mounting bracket 22 is generally trapezoidal in shape and has a front side 24, a rear side 25 and angled side surfaces 26. A total of six apertures 28 extend through mounting bracket 22.

A generally U-shaped frame 30 includes a pair of arms 32 that are connected to the mounting bracket 22 and extend away from mounting bracket 22. Each arm 32 has a proximal end 34 and a distal end 36. Each arm also has an inner surface 38 and an outer surface 40. The proximal end 34 of each arm is bent inwardly forming an integral finger 42. Each finger 42 is located adjacent to front surface 24. Each finger 42 has a pair of holes 44 extending there through. As will be described later, a fastener can be used to connect arms 32 to mounting bracket 22. In another embodiment, fingers 42 can be welded to mounting bracket 22. Apertures 47 are located toward the center of each arm 32 and extend through each arm 32. The distal end 36 of each arm is attached with an integrally formed cross-member 48. When mounting bracket 22 is in a vertical position, arms 32 are oriented at a downward sloping angle relative to mounting bracket 22 (best seen in FIGS. 5 and 6) such that cross-member 48 is located below mounting bracket 22.

Cross-member 48 has ends 50 that are connected to distal ends 36. Cross-member 48 further has an inwardly formed shoulder 52 that defines a recess 54 along an outer surface of cross-member 48. A pair of spaced apart slots 56 are formed in cross-member 48 at each of cross-member ends 50.

A hitch plate 58 is mounted to cross-member 48. Hitch plate 58 has a top side 60, a bottom side 62, a front side 64, a back side 66 and opposed ends 68. A nose 70 extends outwardly from front side 64. A cutout 72 is located in nose 70 and extends through nose 70 between top side 60 and bottom side 62. Cutout 72 is adapted to be connected with a device from a towing vehicle such as a towbar. The opposed ends 68 are received in slots 56 along back side 66. The hitch plate 58 is connected to cross-member 48 by welding along the junction of slot 56 and ends 68.

Frame 30 including arms 32 and cross-member 48 surrounds and defines an opening 74 in the center of hitch 20. The opening 74 is shown having a generally trapezoidal shape; however, opening 74 can have a variety of other shapes such as rectangular, square, circular or other irregular shapes.

Hitch 20 further includes a pair of support members 80 connected between the mounting bracket 22 and the frame 30. Support members 80 add additional structural support to hitch 20. Support members 80 have ends 82 and 84. A pair of holes 86 are defined in each end 82 and a hole 88 is defined in each end 84. Fasteners 90 are mounted through apertures 47 and holes 86 in order to connect support members 80 to arms 32. Fasteners 90 can be any suitable fastener such as bolts and nuts, rivets or pins and cotter key.

A reinforcing bar 94 is connected to an inner side 38 of each of the arms 32. A portion of the reinforcing bar 94 is curved and extends onto the inner surface ends 50 of cross-member 48. Reinforcing bar 94 can be welded to the inner side 38 of arms 32.

C. Towed Vehicle.

Figure 7:
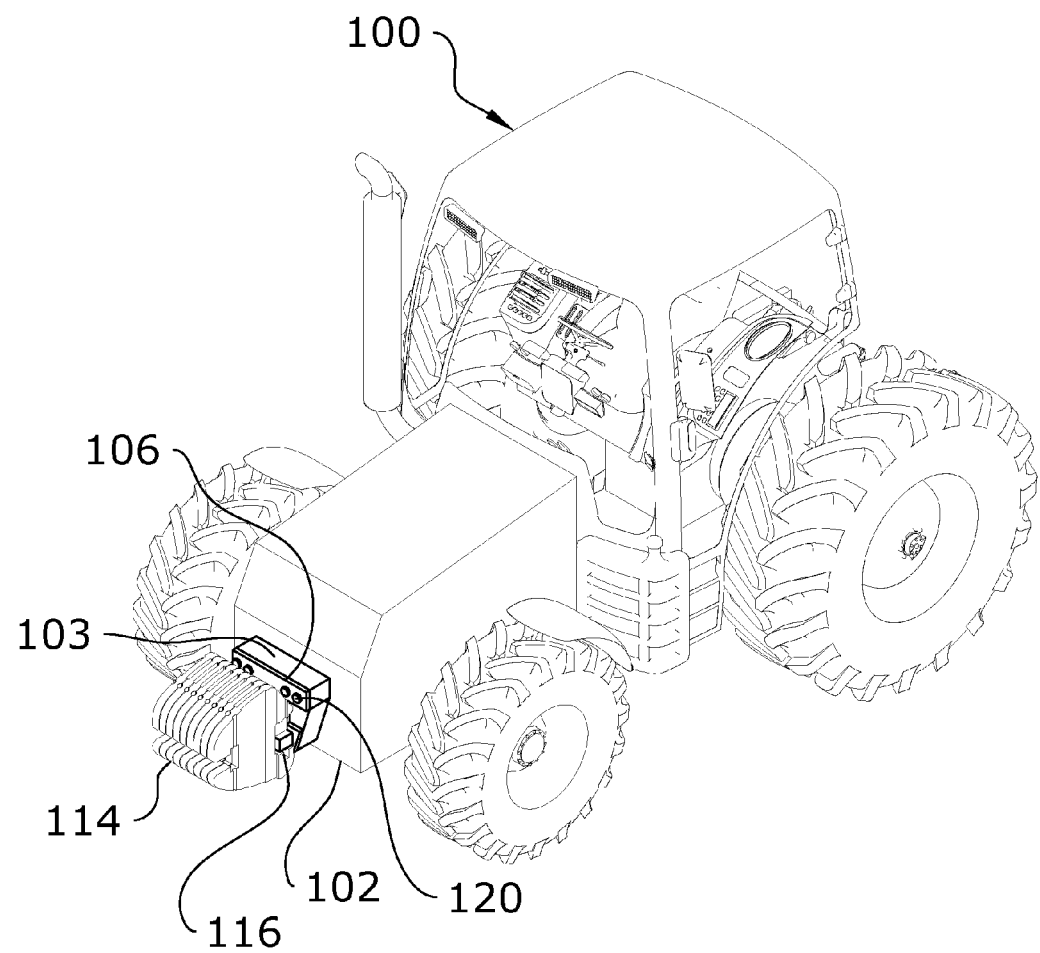
FIG. 7 is a front perspective view of a tractor with attached front weights.
Figure 8:
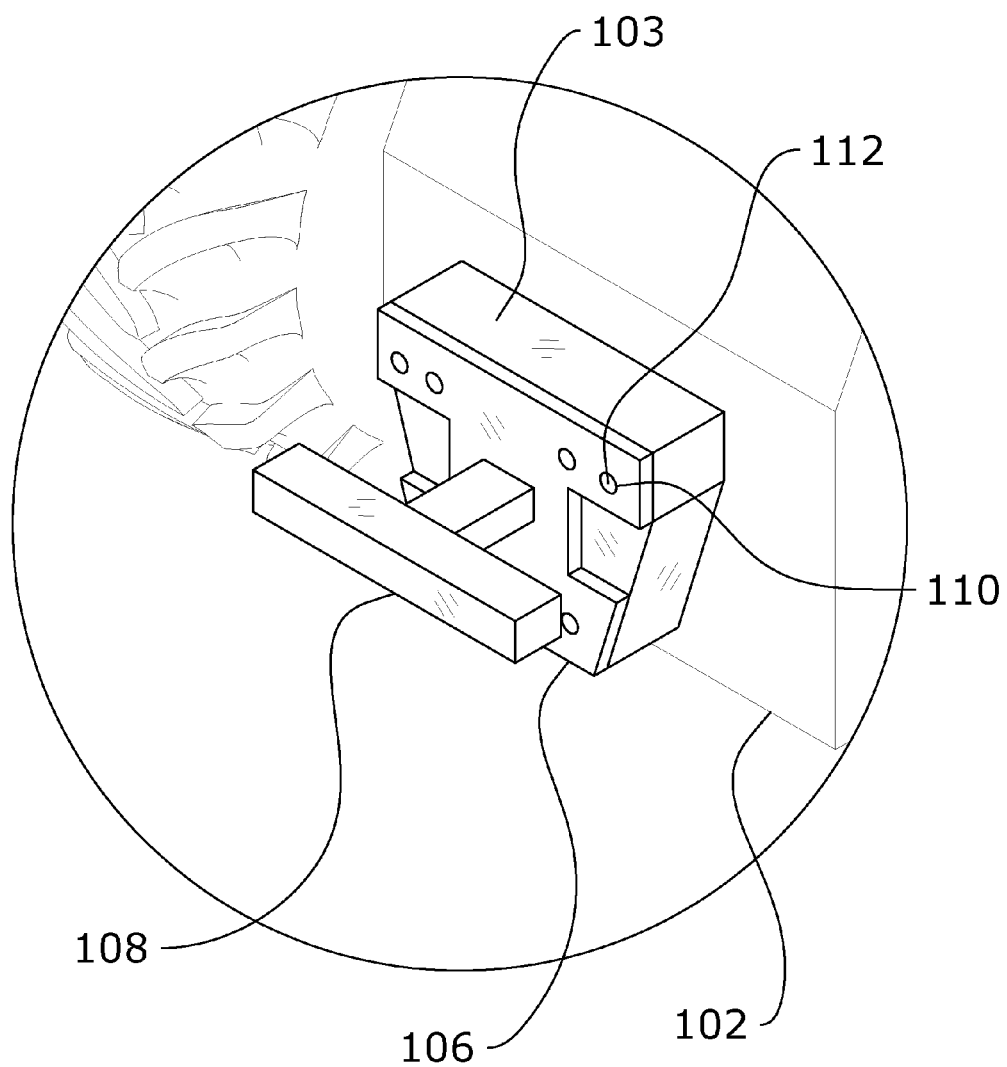
FIG. 8 is an enlarged front perspective view of the weight mounting bracket.

Referring to FIGS. 7 and 8, a towed vehicle 100 such as an agricultural tractor is shown. Towed vehicle 100 has a frame 102 with a front frame portion 103. Attached to the front frame 103 is a weight support bracket 106. The weight support bracket 106 has a T-shaped bar 108 that extends away from the front of the weight support bracket and apertures 110. Coaxial with each of the apertures 110 are threaded bores 112 within front frame portion 103. Fasteners 120 such as threaded bolts are used to attach weight support bracket 106 to front frame portion 103. Fasteners 120 extend through apertures 110 and are received by threaded bores 112. Several tractor weights 114 can be attached to weight support bracket 106. The weights 114 are used to counter balance a load on the towed vehicle 100. Each weight 114 has a hook portion 116 that is placed over and engages with the T-shaped bar 108 in order to retain the weights 114 to towed vehicle 100. Because the weights 114 are mounted at the front of the towed vehicle, they can block attachment of towing devices and subject to damage, if the towed vehicle 100 requires towing.

D. Hitch Assembly Mounted to Towed Vehicle.

Figure 9:
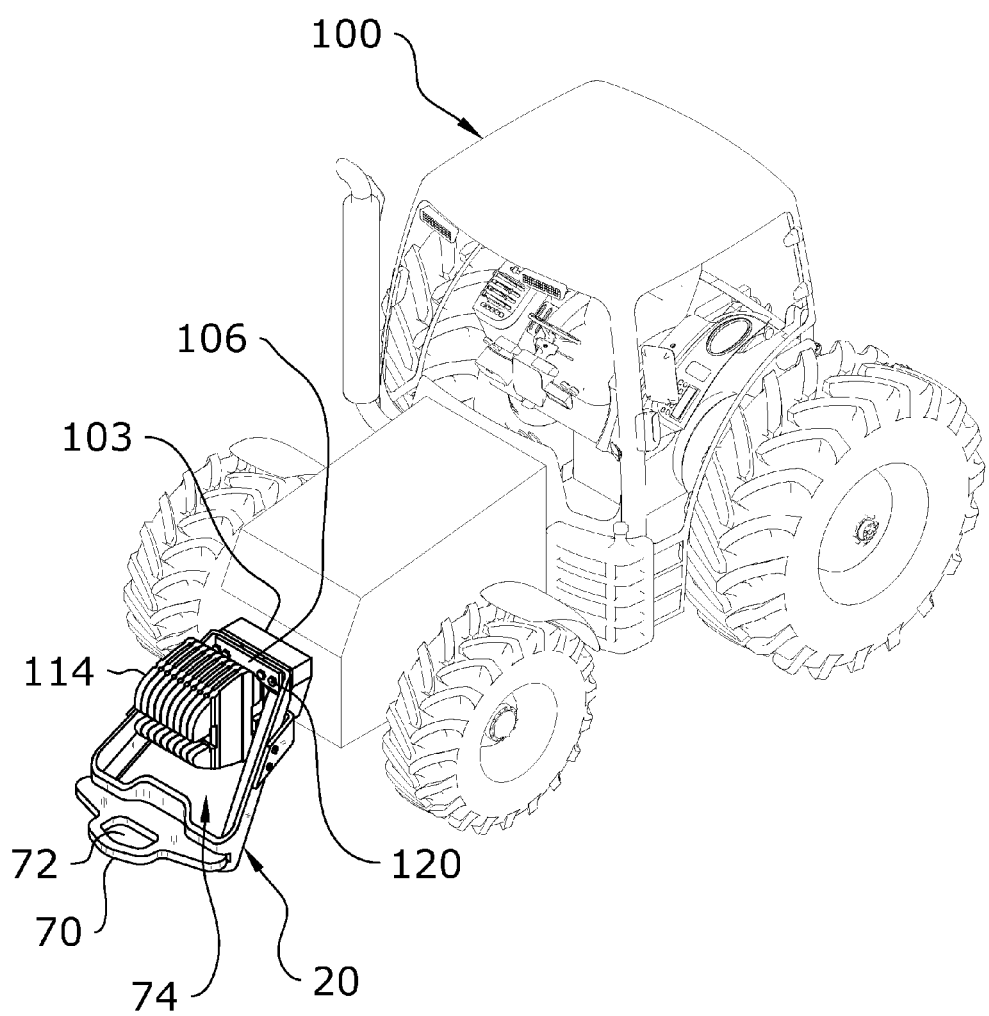
FIG. 9 is a front perspective view of a tractor having an attached tractor hitch surrounding the front weights.
Figure 10:
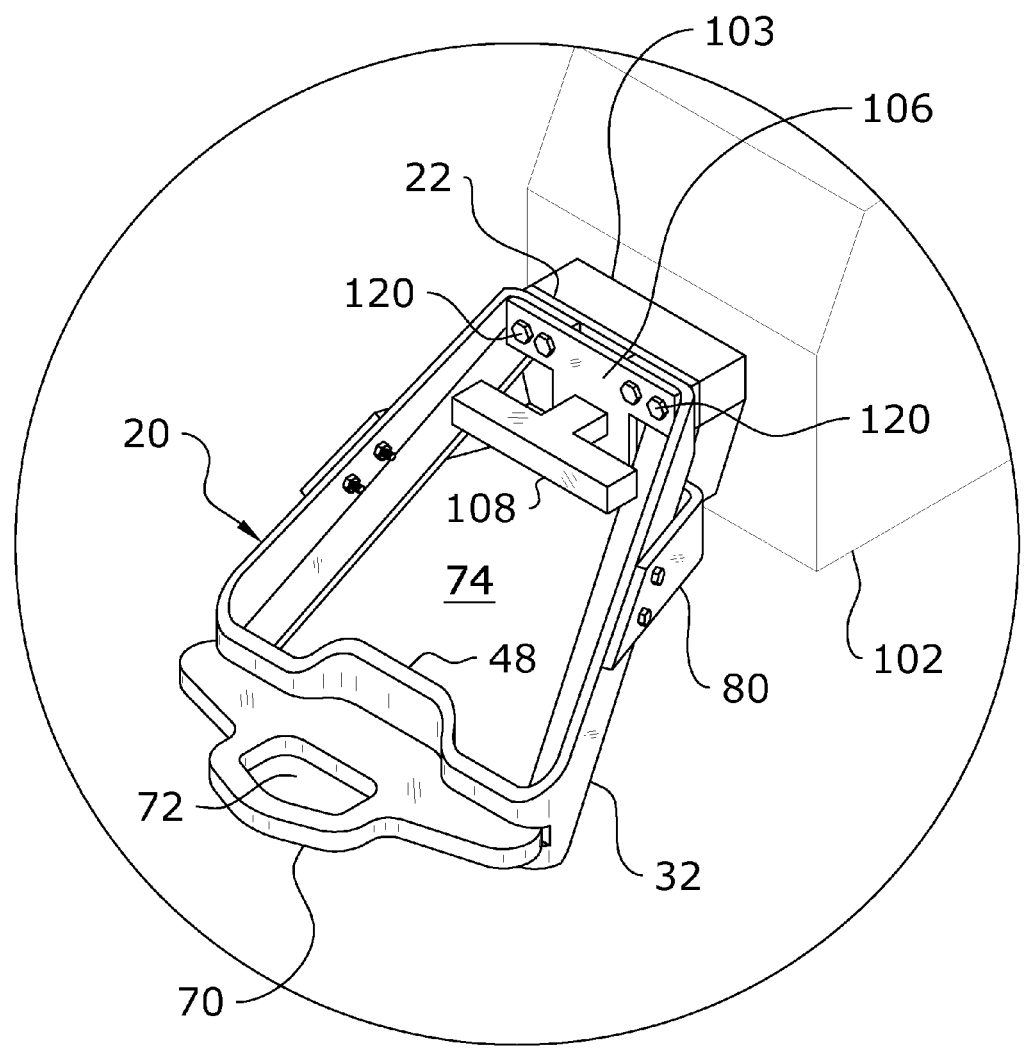
FIG. 10 is an enlarged front perspective view of the tractor hitch attached to the tractor.
Figure 11:
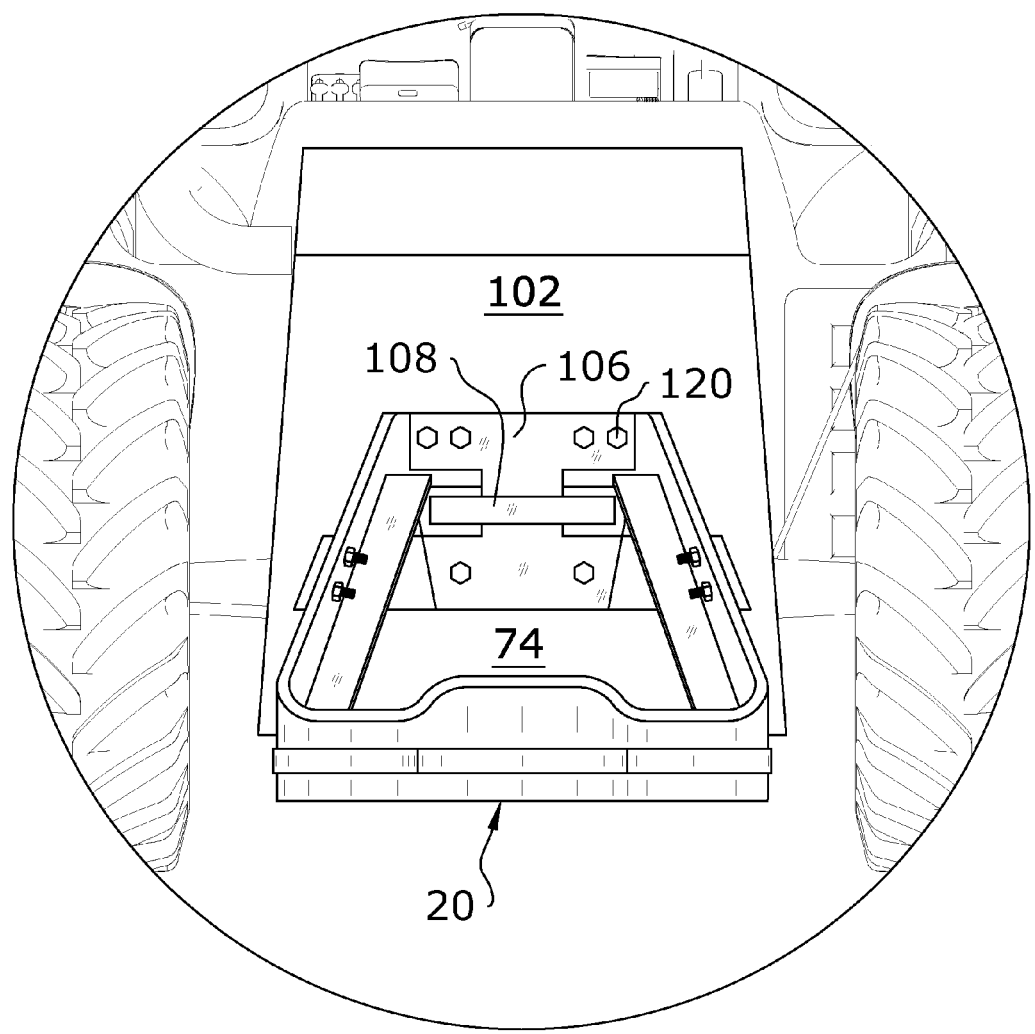
FIG. 11 is an enlarged front view of the tractor hitch attached to the tractor.

With reference to FIGS. 9 through 11, hitch assembly 20 is shown mounted to towed vehicle 100. During installation of hitch 20, fasteners 120 and weight support bracket 106 are initially disconnected and removed from front frame portion 103. Hitch 20 and mounting bracket 22 are placed adjacent to front frame portion 103 with mounting bracket rear side 25 resting against the front of front frame portion 103. Weight support bracket 106 is then placed in front of hitch 20. Specifically, weight support bracket 106 is mounted adjacent to fingers 42, support arm ends 84 and mounting bracket 22 such that the back side of the mounting bracket is adjacent to fingers 42 and ends 84. One set of fasteners 120 are inserted through weight support bracket apertures 110, through finger holes 44, through mounting bracket apertures 28 and received by threaded bores 112. Another set of fasteners 120 are inserted through weight support bracket apertures 110, through support member holes 88, through mounting bracket apertures 28 and received by threaded bores 112. Tightening of fasteners 120 secures hitch 20 to towed vehicle 100.

After hitch 20 has been attached to towed vehicle 100, weights 114 can be attached to weight support bracket 106. Each weight 114 is placed into opening 74 and the hook portion 116 connected over and engaged with the T-shaped bar 108 in order to retain the weights 114 to towed vehicle 100. With the weights 114 installed, the weights 114 are surrounded by frame 30 and are located within opening 74. Specifically, the weights 114 are surrounded by arms 32 and cross-member 48.

D. Operation of Preferred Embodiment.

Turning to FIG. 9, after hitch 20 has been attached to towed vehicle 100 and weights 114 attached, towed vehicle 100 can be used for normal operation. The weights 114 are used to counter balance a load on the towed vehicle 100. Should towed vehicle 100 become stuck and not able to move under its own power, towed vehicle 100 will require a pull or tow by a towing vehicle in order to move. Hitch 20 allows for a towing connection to be readily made with towed vehicle 100 having attached front weights 114. A tow bar (not shown) connected to a towing vehicle (not shown) can be connected to hitch 20 in order to remove towed vehicle 100 from a stuck location. One such tow bar is the Saf-T-Pull tow bar commercially available from Kringstad Iron Works Corporation of Hoople, N. Dak. Specifically, the tow bar has a hook portion that grasps around nose 70 and through cutout 72. With the tow bar engaged with hitch 20, the towing vehicle can extract the towed vehicle 100 from the stuck location.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A hitch for attachment to a towed vehicle comprising:
   a mounting bracket;
   a frame connected to the mounting bracket, the frame having a pair of arms extending away from the mounting bracket, the arms surrounding and defining an opening;
   a plate connected to the frame, the plate having a cutout;
   wherein the arms surround at least one weight coupled to the towed vehicle, the at least one weight extending into the opening;
   wherein the arms each have a proximal end connected to the mounting bracket and each arm has a distal end connected to a cross-member, the plate connected to the cross-member; and
   wherein the cross-member has a slot, the plate at least partially mounted in the slot.

2. The hitch of claim 1, further comprising a support member connected between the bracket and the frame.

3. The hitch of claim 1, further comprising a reinforcing bar connected to an inner side of the arm.

4. The hitch of claim 1, wherein the mounting bracket is configured to be attached to a front of the towed vehicle.

5. A hitch for attachment to a towed vehicle comprising:
   a mounting bracket adapted to be attached to the towed vehicle;
   a frame connected to the mounting bracket, the frame having a pair of arms extending away from the mounting bracket and terminating in a connected cross-member, the arms surrounding and defining an opening; and
   a plate connected to the cross-member, wherein the cross-member has a slot, the plate at least partially mounted in the slot.

6. The hitch of claim 5, further comprising a support member connected between the bracket and the frame.

7. The hitch of claim 5, wherein the arms each have a proximal end connected to the mounting bracket and each arm has a distal end connected to the cross-member.

8. The hitch of claim 5, further comprising a reinforcing bar connected to an inner side of each of the arms.

9. The hitch of claim 5, wherein the plate has a cutout, the cutout adapted to be coupled to a towing vehicle.

10. The hitch of claim 5, wherein the arms surround at least one weight coupled to the towed vehicle, the at least one weight extending into the opening.

11. A hitch for attachment to a towed vehicle comprising:
    a mounting bracket;
    a frame having a proximal end connected to the mounting bracket and a distal end, the frame surrounding and defining a central opening;
    a plate connected to the distal end of the frame, the plate having a cutout;
    wherein the frame surrounds at least one weight coupled to the towed vehicle, the at least one weight extending into the central opening;
    wherein the frame further comprises a pair of spaced apart arms, each of the arms has a proximal end connected to the mounting bracket and a distal end connected to a cross-member, the plate connected to the cross-member; and
    wherein the cross-member has a slot, the plate at least partially mounted in the slot.

12. The hitch of claim 11, wherein the frame is U-shaped.

13. The hitch of claim 11, further comprising a support member connected between the bracket and the frame.

* * * * *